(12) United States Patent
Hurst (10) Patent No.: US 9,435,362 B2
(45) Date of Patent: Sep. 6, 2016

(54) BOLT AND NUT ASSEMBLY WITH PLASTIC COVER FOR CONTROLLED SEALING COMPRESSION

(71) Applicant: Morgan Trailer Financial Management, L.P., Houston, TX (US)

(72) Inventor: William Hurst, New Holland, PA (US)

(73) Assignee: Morgan Truck Body, LLC, Houston, TX (US)

(*) Notice: Subject to any disclaimer, the term of this patent is extended or adjusted under 35 U.S.C. 154(b) by 283 days.

(21) Appl. No.: 14/197,821

(22) Filed: Mar. 5, 2014

(65) Prior Publication Data

US 2015/0252828 A1 Sep. 10, 2015

(51) Int. Cl.
| | |
|---|---|
| *F16B 21/00* | (2006.01) |
| *F16B 5/02* | (2006.01) |
| *F16B 33/00* | (2006.01) |
| *F16B 37/14* | (2006.01) |

(52) U.S. Cl.
CPC ........... *F16B 5/0258* (2013.01); *F16B 33/004* (2013.01); *F16B 37/145* (2013.01); *F16B 37/14* (2013.01)

(58) Field of Classification Search
CPC ... F16B 5/0258; F16B 33/004; F16B 37/145
USPC ....... 411/338, 369, 371.1, 372.5, 372.6, 373, 411/377
See application file for complete search history.

(56) References Cited

U.S. PATENT DOCUMENTS

| | | | |
|---|---|---|---|
| 3,175,454 A | 3/1965 | Morse | |
| 3,175,462 A | 3/1965 | Disley | |
| 3,186,049 A | 6/1965 | Fiddler | |
| 3,557,654 A | 1/1971 | Weidner, Jr. | |
| 3,618,444 A * | 11/1971 | Kay | ........................ F16B 37/14 411/373 |
| 3,835,906 A | 9/1974 | Dietlein | |

(Continued)

FOREIGN PATENT DOCUMENTS

| | | |
|---|---|---|
| EP | 0588467 A1 | 3/1994 |
| WO | 2006119401 A2 | 11/2006 |

OTHER PUBLICATIONS

Precision Castparts Corporation; Fastener Products, Aerospace Fasteners and Precision Components; 2010 (16 pages).

(Continued)

*Primary Examiner* — Gary Estremsky
(74) *Attorney, Agent, or Firm* — Osha Liang LLP; John W. Montgomery (57) ABSTRACT

A fastener has a head with an exterior end surface and a compression ledge. A projection extends from the compression ledge and a contact shoulder is formed at an intersection of the projection and the compression ledge. The shoulder has a thickness measured axially from the compression ledge and extends radially outward from the projection to the intersection of the shoulder and the compression ledge. A compressible sealing component encapsulates the exterior end surface of the head and partially overlaps an area entirely around the compression ledge. The compressible sealing component at the area of the compression ledge has an uncompressed axial thickness greater than the shoulder thickness measured from the compression ledge. A rotation preventer is formed on the projection and is configured to allow axial movement of the projection into a hole and to restrict rotation of the fastener when the projection extends into the hole.

21 Claims, 7 Drawing Sheets

(56) References Cited

U.S. PATENT DOCUMENTS

| | | | | |
|---|---|---|---|---|
| 3,885,492 | A * | 5/1975 | Gutshall | A47G 3/00 411/373 |
| 4,452,556 | A * | 6/1984 | Nelson | F16B 23/0023 411/377 |
| 4,472,097 | A | 9/1984 | Kiefer et al. | |
| 4,887,951 | A * | 12/1989 | Hashimoto | F16B 33/004 411/369 |
| 5,006,026 | A * | 4/1991 | Estrada | F16B 35/06 411/369 |
| 5,244,326 | A | 9/1993 | Henriksen | |
| 5,251,370 | A | 10/1993 | Muller et al. | |
| 5,906,463 | A * | 5/1999 | Damm | F16B 43/001 411/369 |
| 6,244,807 | B1 * | 6/2001 | Garcia | F16B 33/004 411/369 |
| 7,401,394 | B1 | 7/2008 | Muller | |
| 7,575,405 | B2 | 8/2009 | Goodall | |
| 8,398,350 | B2 * | 3/2013 | Ishida | F16B 33/008 411/369 |
| 8,434,982 | B2 * | 5/2013 | Henriksen, Jr. | F16B 37/14 411/338 |
| 2003/0118419 | A1 | 6/2003 | Easterbrook et al. | |
| 2010/0129173 | A1 | 5/2010 | Babej et al. | |
| 2010/0251661 | A1 * | 10/2010 | Illgner | F16B 33/004 52/698 |
| 2011/0116891 | A1 | 5/2011 | Notaro et al. | |

OTHER PUBLICATIONS

APM Corporation; SEELNUTS® Self-Sealing Fasteners & Nuts; http://apmhexseal.com/ProdSearch_details.aspx?PID=26; 2011 (3 pages).

APM Corporation; Type ST Hexagon Head SEELBOLTS Self-Sealing Fastners & Nuts; http://apmhexseal.com/ProdSearch_details.aspx?PID=24; 2011 (3 pages).

APM Corporation; Self-Sealing Fasteners, Washers & Threadlockers; http://apmhexseal.com/Self-Sealing_Fasteners.aspx; 2013 (3 pages).

Sap-Seal® Products, Inc:, Series 10 Screw and Bolt Protection Caps—Sap-Seal®; http://www.sapseal.com/series10.aspx; 2013 (1 page).

Atlas Bolt & Screw Company, LLC; UltiMate Low Profile Fastener, Metal to Metal Fastener; Ultimate Long-Life Fasteners; http://www.atlasfasteners.com/UltiMate.html; 2013 (3 pages).

Atlas Bolt & Screw Company, LLC; #12 Ultimate Woodscrew, http://www.atlasfasteners.com/12-UltiMate.html; 2013 (2 pages).

Sealing Screws E-Catalog; http://sealscrews.com; printed on Oct. 15, 2013 (1 page).

* cited by examiner

BOLT AND NUT ASSEMBLY WITH PLASTIC COVER FOR CONTROLLED SEALING COMPRESSION

BACKGROUND OF INVENTION

1. Field of the Disclosure

Embodiments disclosed herein relate generally to a fastener for securing two panels together. More particularly, embodiments disclosed herein relate to a sidewall fastener having a surface for sealing contact with an exterior body component and a sidewall panel together.

2. Description of the Related Art

Many different types of fastening components are used for securing panels to structures and in particular for use in truck and van body industry. As would be understood by those having ordinary skill, fastening components are typically designed for a specific applications, one such example is sidewall fasteners. Sidewall fasteners are used to hold an exterior body component and a sidewall panel of the van body together. Such sidewalls may for example be of a type for construction of truck bodies, van bodies, trailers, or other types of enclosures and structure used to hold goods or products and/or to ship or to transport goods from one location to another by roadways, railroad tracks, waterways or airways.

Figure 1:
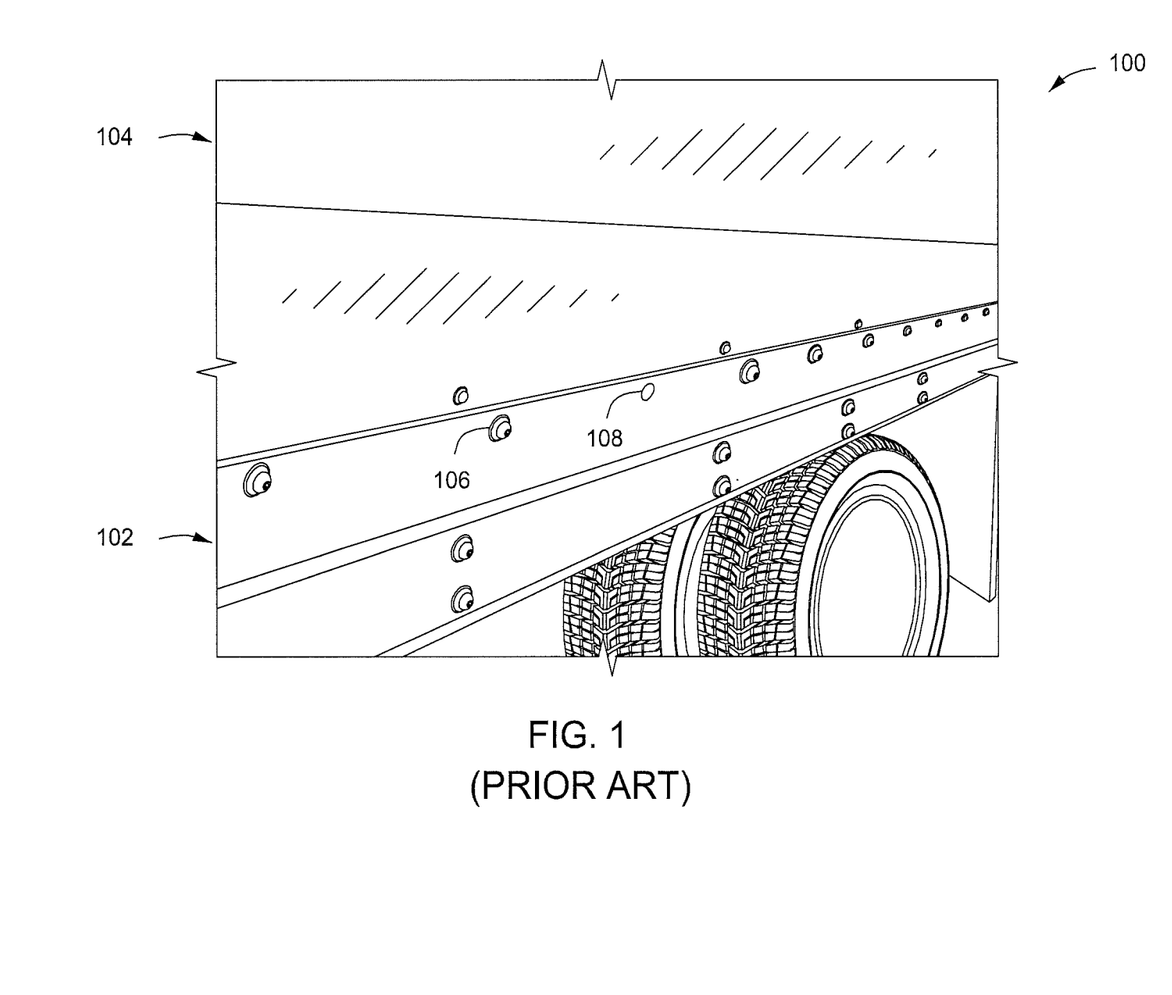
FIG. 1 is a perspective view of a truck van body assembly with fasteners inserted into holes to secure the side panel to the truck body.

Referring now to FIG. 1, a prior art truck van body 100 is shown. As depicted, truck body 100 includes an exterior body component 102 and a sidewall panel 104. The exterior body component 102 and the sidewall panel 104 may be held together by fastening component 106. As would be understood by those having ordinary skill, hole 108 extends through the exterior body component 102 and another mating hole 109 (not shown in FIG. 1, see FIG. 3) extends through the sidewall panel 104. The hole 108 receives the fastening component 106, which allows for the exterior body component 102 and the sidewall panel 104 to be secured together by the fastening component 106.

Figure 2:
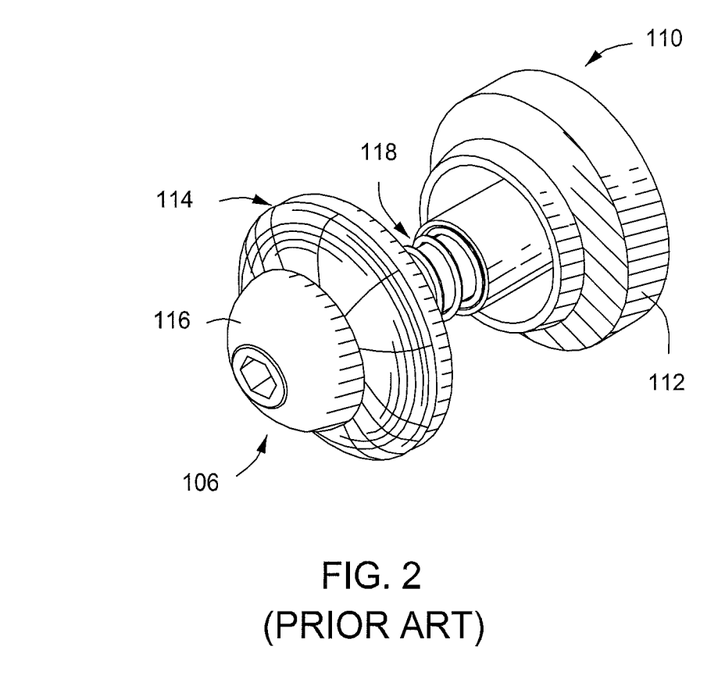
FIG. 2 is a perspective view of a fastener assembly of FIG. 1.

Referring now to FIG. 2, a perspective view of the prior art fastening component 106 is shown. The fastening component 106 is shown outside of the van body 100 (see FIG. 1) in a connected or made-up configuration, i.e., threaded together. As shown, the fastening component 106 comprises a nut 110, having a plastic cap 112 encapsulating an end thereof. Fastening component 106 further comprises a bolt 114, including a head 116 and shaft 118. The shaft 118 is threadedly received in the nut 110.

Figure 3:
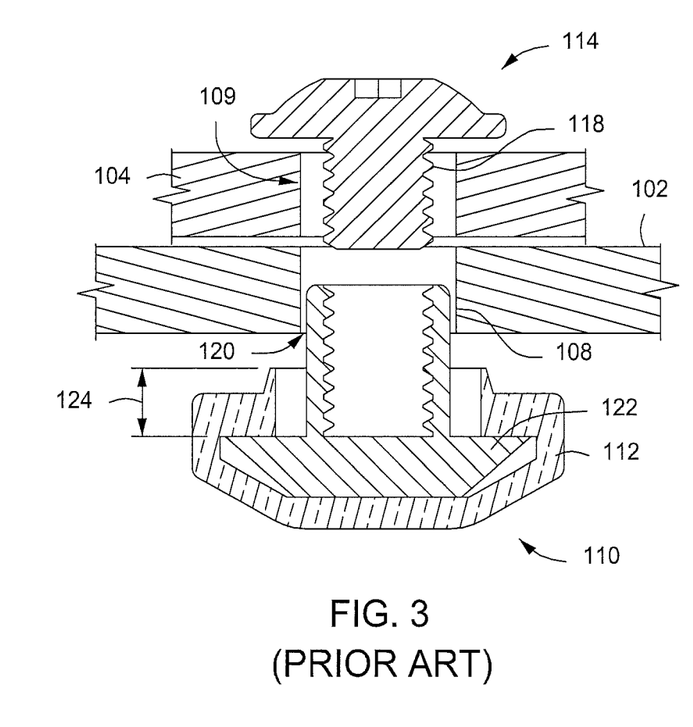
FIG. 3 is a cross-sectional view of an external fastener component of the fastener inserted through aligned holes formed in the body and panel of FIG. 1.

Referring now to FIG. 3, a cross-sectional view of the prior art nut 110 of fastening component 106 (FIG. 1) is shown. As shown, the nut 110 is partially inserted into hole 108 through the exterior body component 102. The nut 110 has a projection 120 and an end portion 122 on opposing ends thereof. Plastic cap 112 is disposed on the end portion 122 of nut 110. The plastic cap 112 has a thickness 124 measured in an axial direction of the nut 110, as shown.

When the nut 110 is fully inserted into the hole 108 and the nut 110 and bolt 114 are tightened together to hold the sidewall panel 104 securely to the exterior body component 102. The plastic cap 112 on nut 110 may be used to provide a seal around the hole 108 and prevent debris or moisture from entering hole 108. The plastic cap 112 will be compressed between the end portion 122 of nut 110 and the exterior body component 102. Compressing the plastic cap 112 between the end portion 122 of nut 110 and the exterior body component 102 will cause a compression load to be distributed through the plastic cap 112 and to the end portion of nut 110. Further, plastic cap 112 absorbs the compression load from the nut 110 and bolt 114 being tightened, which decreases the thickness 124 of plastic cap 112. The compression load causes the plastic cap 112 to permanently deform by being flattened between the end portion 122 of nut 110 and the exterior body component 102. The flattening of the portion of the plastic cap material between the nut and the exterior of the truck body may continue as the nut is rotated for tightening until the plastic with an original thickness 124 is partially compressed or until it is compressed to a very thin thickness depending upon the total amount of relative rotation or tightening of the nut 110 and bolt 114.

SUMMARY OF INVENTION

A system is disclosed and claimed that includes a body component having at least one hole; a sidewall panel having at least one other hole that corresponds with the hole of the body component when aligned. An external fastener component comprises a projection configured to extend into the at least one hole in the body component and the corresponding at least one other hole in the sidewall panel. A head formed on a distal end of the projection comprises an exterior end surface; an edge surrounding the exterior end surface; a compression ledge extending partially inward from the edge toward the projection; and a contact shoulder extending partially outward from the projection toward the edge and raised axially from the compression ledge a predetermined shoulder thickness measured axially from the compression ledge. A rotation preventer is formed on the projection and configured to restrict rotational movement of the external fastener component within the at least one hole in the body component and a compressible sealing component covers the head of the that extends over the exterior end surface of the head and extends radially inward towards the projection and at least partially overlapping an area entirely around the compression ledge, wherein the compressible sealing component at the partially overlapping area has an uncompressed axial thickness greater than the shoulder thickness; and an internal fastener component is configured to couple with the projection through the mating at least one hole and the at least one other hole to hold the contact shoulder of the external fastener component in contact with the exterior body component and to compress the sidewall panel and the exterior body component together therebetween. The compressible sealing component is configured to form a seal when partially compressed between the exterior body component and the compression ledge and the contact shoulder is configured to abut the exterior body component when the compressible sealing component, the sidewall panel, and the exterior body component are compressed together between the external fastener component and the internal fastener component.

A fastener is disclosed comprising a head including an exterior end surface and a compression ledge, a projection that extends from the compression ledge, a shoulder formed at an intersection of the projection and the compression ledge, the shoulder comprises a shoulder thickness measured from the compression ledge and extends axially along the projection. A compressible sealing component is configured to encapsulate the exterior end surface and at least partially overlaps an area entirely around the compression ledge, wherein the compressible sealing component at the area of the compression ledge comprises an uncompressed axial thickness that extends greater than the shoulder thickness, the uncompressed axial thickness measured in an axial direction of the projection and from the compression ledge.

A rotation preventer is formed on the projection and configured to restrict rotation of the fastener when the projection extends into a hole through an exterior body component and a sidewall panel in order to be received therethrough and to hold the body component and sidewall panel together, wherein the rotation preventer allows axial movement of the fastener compressing the sealing component against the body component an amount controlled by contact of the shoulder against the body component.

BRIEF DESCRIPTION OF DRAWINGS

FIG. 9 is a cross-sectional view of the external fastener component of

FIG. 7 and an internal fastener component connected between a body and a panel.

DETAILED DESCRIPTION

Embodiments disclosed herein relate to assemblies and methods to control the amount of compression experienced by a compressible sealing component. Embodiments disclosed herein may also generally relate to a shoulder surface for controlling the amount of compression experienced by the compressible sealing component. One or more embodiments disclosed herein, relate to a sidewall fastener having a surface for controlled compression of an exterior body component and a sidewall panel together while providing a controlled compression seal around the fastener.

The inventors have found that for the prior art fastener of FIGS. 1-3, that originally fully tightened fasteners may become loose after a period of time thereby resulting in a lack of sealing and allowing the fastener to shake loose during transport of the truck body. It has been discovered that this may result from vibrational or cyclic loads incurred when a transport vehicle is moving, especially along a roadway for long periods of time. The repetitive increase and decrease in forces on the fastener are transmitted through the compressed plastic causing it to permanently deform during peak loading and then loosening during lowered loading. The assembly may also be exposed to variations of temperature and different coefficients of thermal expansion for the fastener and for the truck body can cause additional compression on the plastic between the head and the exterior panel so that the plastic cap is further permanently deformed and flattened. A fastener made of steel generally expands less than a truck body and panel made of aluminum such that thermal expansion of the body and panel is greater than that of the fastener and this causes excessive compression in the portion of plastic cap between the head and the body panel, further permanently deforming the plastic. Also, when a critical level of mechanical stress is applied to a plastic cap material for an extended period of time or on a repetitive basis, the plastic material may also exhibit plastic creep, causing additional permanent deformation (referred to herein as just "creep"). Further, the amount of creep increases with higher temperature.

As discussed above, it has been found by the inventor that in the prior art fastener with plastic cap seal, the plastic material will permanently deform or creep if it experiences a critical level of mechanical stress, repeatedly or for an extended period of time. With reference to FIG. 1 it may be understood from the present disclosure that when the plastic cap 112 is compressed between the end portion 122 of nut 110 and the exterior body component 102 the plastic material in plastic cap 112 permanently deforms, which decreases the thickness 124. The permanent deformation in the plastic cap 112 causes the seal between the hole 108 and plastic cap 112 to weaken and ultimately to be lost entirely, as the thickness 124 of plastic cap 112 decreases. Further, the amount of deformation the plastic cap 112 undergoes over time (i.e., the decrease in thickness 124) determines the tightness of the connection. For example, initial compression of plastic cap 112 provides a tight or strong connection, up to the point of the maximum compression strength of the plastic before permanent deformation begins to occur. Additional initial tightening does not increase the tightness of the seal. Further tightening beyond the maximum compression strength of the plastic only results in more deformation of the plastic. Subsequently during use, such as in a truck body and panel assembly used on the road, the plastic may deform more because of repeated application of increased and stress on the plastic, for example due to shaking, thermal expansion, and creep of the plastic. After such additional stress permanent deformation occurs. Without retightening the fastener, the defolluation and resulting decrease in thickness 124 of plastic cap 112 will eventually cause the amount of compression on the plastic cap 112 to be reduced, which as discussed above, will weaken the connection (i.e., less tightness or compression and reduced sealing at the connection) over time and eventually without any tension between the threads of the fastener, may allow the fastener to shake lose, freely rotated due to vibration over time. The seal is therefore lost between the net and the body and panel thereby allowing unwanted leakage of dust, moisture, and corrosive elements such as road salt. Eventually the fattener may fall out of the hole completely. Also, it is found that the greater the compression of the plastic cap 112 initially (i.e., the more the connection is tightened) the greater the forces in the plastic material and the more it will permanently deform due to added compression from thermal effects and also the more it will creep. It has been found that additional tightening of a traditional fastener with a plastic cap other sealing element does not solve the situation.

Particularly, in truck bodies, van bodies and other enclosures and paneled structures moved along roadways and highways, the connection experiences a significant amount of vibration during normal operation (e.g., driving on the highway). As discussed above, repeated peak loading due to vibration, thermal expansion and contraction, and due to creep permanently deforms the compressed part of the plastic cap 112 and weakens the overall connection. Thus, the vibration may cause the nut 110 to loosen or unscrew from the bolt 114 (FIG. 2), because the nut is no longer holding the truck body or van body together. Further, the nut 110 may loosen itself, the seal may be lost to allow leakage, and the fastener may simply falls out of the hole, resulting in complete connection failure. Thus, uncontrolled compression of the plastic cap 112 causes the overall connection to weaken and ultimately fail. However, it has been discovered by the inventor that controlling the compression or reducing the amount of compression in the sealing part of the plastic cap 112 to remain below a critical level will prevent permanent deformation in the plastic cap 112 and prevent connection failure. Therefore, controlling the amount of compressive forces imparted to the plastic cap 112 will result in increased structural integrity of the connection, a longer lasting connection, and a strong seal around the hole and head of the fastener.

Figure 4:
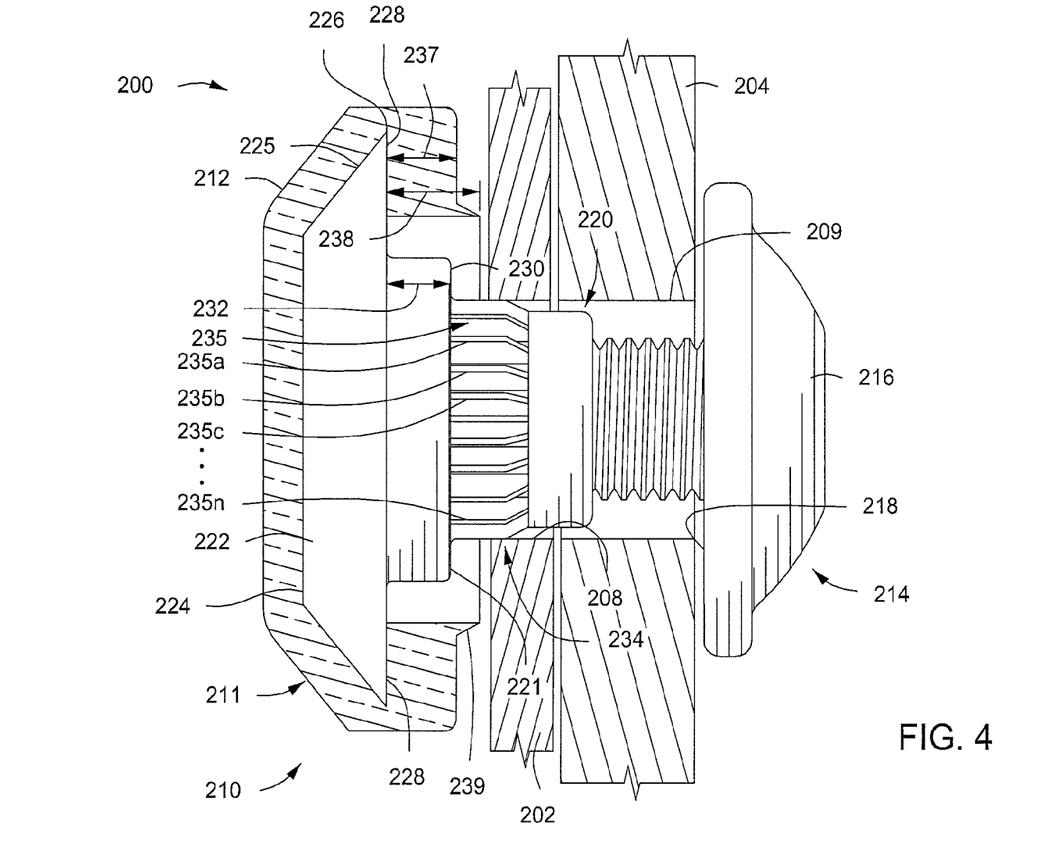
FIG. 4 is a partial cross-sectional view of external and internal fastener components connected together through the body and panel in accordance with one or more embodiments disclosed herein.

Referring now to FIG. 4, an assembly view of a body and panel connection 200 prior to being tightened is shown. For example, this may be a truck body or a van body and a side panel connection 200 including an exterior body component 202 having at least one hole 208 that extends therethrough and a sidewall panel 204. The connection 200 of one or more embodiments may include a sidewall panel 204 having at least one hole 209 that extends therethrough. The at least one hole 209 in the sidewall corresponds to the at least one hole 208 in the exterior body component, where the at least one hole 209 and the at least one hole 208 are configured to line up when the exterior body component 202 and sidewall panel 204 are planarly aligned, e.g., parallel. In one embodiment, the exterior body component 202 and sidewall panel 204 might not contact prior to the connection being tightened. In other embodiments, the exterior body component 202 and sidewall panel 204 may contact, even if the body connection 200 has not been made up or tightened yet. The body connection 200 may be referred to as connection 200 or merely the connection. It will be understood by those skilled in the art that while the disclosure shows the truck body exterior to the panel, the panel may be attached exterior to the truck body without interfering with certain aspects of the invention. In that case the fastener sealing component would compress against the panel on the exterior of the connection to prevent leakage from outside.

The body connection 200 further comprises a fastener 210, including an external fastener component 211 and an internal fastener component 214. In one or more embodiments, the external fastener component 211 includes a projection 220 configured to directly couple with an internal fastener component 214. In one embodiment, the projection 220 extends from a head 222 of the external fastener component 210 in an axial direction thereof. The projection 220 is configured to extend into the at least one hole 208 in the exterior body component 202 and the corresponding at least one hole 209 in the sidewall panel 204. The projection 220 is configured to couple with the internal fastener component 214 through the at least one hole 208 formed in the exterior body component 202 and the corresponding at least one hole 209 formed in the sidewall panel 204. The projection 220 of external fastener component 211 directly couples with the internal fastener component 214 by threaded engagement. The terms axial direction or axially extending will be used to describe the direction that lies along a central axis of the projection 220. It will also be understood by those skilled in the art that while the embodiment shown in the figures has internal, or female, threads on the exterior component of the fastener, sometimes referred to herein as the nut, and the external or male threads on the interior component, sometimes referred to as the bolt, the orientation could be reversed provided that the exterior component includes a plastic encapsulated head configuration for controlled sealing compression of the plastic cap as described and claimed herein.

The external fastener component 211 comprises a head 222 formed on a distal end of the projection 220. In one or more embodiments, the projection 220 extends axially from the head 222. The head 222 comprises an exterior end surface 224 and an edge 226 bordering the exterior end surface 224. In one embodiment, the exterior end surface 224 may have a flat or a domed surface (as shown in FIG. 4) and it may have a non-circular or circular shape when viewed from an axial end thereof. A boarder surface 225 between the edge 226 and the end 224 may be angled, curved or another transition shape. In other embodiments, the exterior end surface 224 may have a non-circular shape when viewed from an axial end thereof, for example a polygon or an oval shape, without interfering with certain aspects of the invention.

The head 222 comprises a compression ledge 228 extending partially inward from the edge 226 inward toward and surrounding the projection 220. In one or more embodiments, the projection 220 extends axially from the head 222 comprising an exterior end surface 224 and a compression ledge 228 of the external fastener component 211. In one or more embodiments, the compression ledge 228 is formed on an inner or interior surface of the head 222 and comprises a contact surface area 221 on head 222 that entirely surrounds the projection 220, for example contact surface area 221 may be a flat ring shaped surface when view from an axial end or an axial direction thereof. The contact surface area 221 may alternatively include a conical shape, for example formed by an angled surface rotated around the projection or curved shape provided it contacts with the exterior body component 202 around the hole 208 to space the compression ledge 228 away from the exterior body component 202 when the fastener 210 is tightened. The compression ledge 228 extends radially inward towards the projection from the edge 226, where the radial direction is relative to an axis of the projection 220.

The head 222 comprises a shoulder 230 extending axially from the compression ledge 228 along the projection 220. The shoulder 230 is formed on the head 222 at the intersection of the projection 222 and the compression ledge 228. The shoulder 230 comprises a shoulder thickness 232, where the shoulder thickness 232 is measured from the compression ledge 228 and extends axially along the projection 220 and away from the head 222. The shoulder 230 extends in a radially outward direction from the projection 220. In one or more embodiments the shoulder thickness 232 will be uniform circumferentially around the projection 220. In embodiments with flat contact surface area 221 and flat shoulder 230, the thickness 232 will be a single uniform thickness radially and circumferentially around projection 220. In embodiments where either or both of the contact surface area 221 and the shoulder 230 are not flat the shoulder thickness 232 may be determined as the thickness at the area of contact with the truck body or panel around the hole into which the fastener is inserted. In one embodiment, the shoulder 230 is formed at an intersection of the projection 220 and the compression ledge 228.

The external fastener component 211 comprises a rotation preventer 234 formed on the projection 220 and configured to restrict rotational movement of the external fastener component 211 within the at least one hole 208, 209. In one embodiment, the rotation preventer 234 is configured to restrict rotational movement of the external fastener component 211 when the projection 220 extends into at least one hole 208, 209 through the exterior body component 202 and the sidewall panel 204 in order to be received therethrough by the internal fastener component 214. The rotation preventer 234 is configured to engage an interior surface of the at least one hole 208, 209, when the projection 220 extends into the at least one hole 208 in the exterior body component 202 and the corresponding at least one hole 209 in the sidewall panel 204. Rotation preventer 234 is configured to allow axial movement of the external fastener component 211. In one embodiment, rotation preventer 234 is configured to extend from the projection 220 and mechanically engage an interior surface of the at least one hole 208, 209.

The external fastener component 211 comprises a compressible sealing component 212 that extends over the exterior end surface 224 of the head 222 and extends radially inward towards the projection 220 to at least partially overlap and area entirely around the compression ledge 228. The compressible sealing component 212 at the partially overlap area comprises an uncompressed axial thickness 237 greater than the shoulder thickness 232. The uncompressed axial thickness 237 and the shoulder thickness 232 both being measured in the axial direction of the projection 220 and measured from the compression ledge 228. In one embodiment, the compressible sealing component 212 is configured to encapsulate the exterior end surface 224 of head 222 and at least partially overlaps an area entirely around the compression ledge 228. The uncompressed axial thickness 237 extends further than the shoulder thickness 232, where both thicknesses are measured from the compression ledge 228.

Referring still to FIG. 4, the projection 220 extends axially upward from the compression ledge 228. In one or more embodiments, the projection 220 has a circular cross-section normal to its axis. Rotation preventer 234 comprises at least one spline 235 that extends radially outward from an outer surface of the projection 220.

In one or more embodiments, the external fastener component 211 comprises a nut and the projection 220 comprises internal threads, wherein a first portion of an outer surface of the projection 220 comprises a cylindrical shape and a second portion of the outer surface of the projection comprises a non-circular cross-sectional shape. In this embodiment, the internal fastener component 214 comprises a head 216 and a shaft 218 extending from the head 216 in an axial direction thereof, where the shaft 218 comprises external threads corresponding to the internal threads of the projection 220. In other embodiments, the external fastener component 211 is a bolt or pin and the projection 220 comprises external threads.

In one embodiment, the rotation preventer 234 comprises a non-circular cross-section of the projection 220 and the at least one hole 208, 209 comprises a non-circular cross-section that is configured to correspond with the non-circular cross-section of the projection 220 when the projection 220 is inserted into the at least one hole 208, 209.

Figure 5:
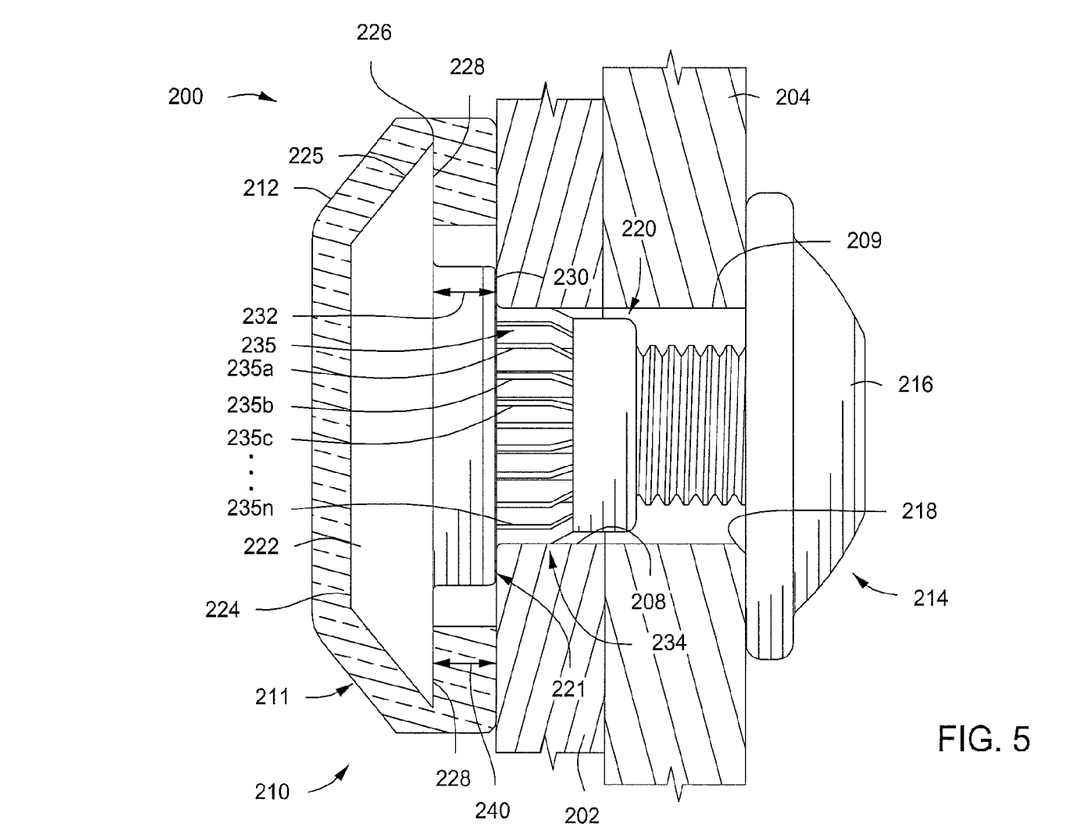
FIG. 5 is a partial cross-sectional view of the external and internal fastener components compressing the body and panel of FIG. 4.

Referring now to FIG. 5, an assembly view of van body connection 200 after having been tightened is shown. Like reference numbers and features described in FIG. 4 correspond to like reference numbers and features in FIG. 5. In one embodiment, the exterior body component 202 and sidewall panel 204 are compressed together by tightening fastener 210 at the van body connection 200.

Internal fastener component 214 is configured to couple with the projection 220 through the at least one hole 208, 209 and to hold the shoulder 230 of the external fastener component 211 in contact with the exterior body component 202 and to compress the sidewall panel 204 and the exterior body component 202 together therebetween when the connection 200 is tightened. In one embodiment, the internal fastener component 214 couples with the projection 220 and holds the shoulder 230 of the external fastener component 211 in contact with a portion of the exterior body component 202 surrounding the at least one hole 208. The shoulder 230 contacts the portion of the exterior body component 202 surrounding the at least one hole 208, when the connection 200 is tightened, which transmits a compressive load from the shoulder 230 through exterior body component 202 and sidewall panel 204 to the internal fastener component 214. The compressive load applied to the plastic cap between the compression ledge 228 and the exterior body component 202 around the at least one hole 208 is controlled by the shoulder 230 contacting or abutting the exterior body component 202 so that the thickness of the plastic cap at 237 (in FIG. 4) compresses only a predetermined amount equal to the difference between the thickness 237 of the cap and the thickness 232 of the shoulder 230. The cap is compresses a predetermined amount equal to the difference between the thickness 237 and the shoulder thickness 232. In an alternative embodiment in which the cap thickness 237 is approximately equal to the thickness 232 of the shoulder and the amount of sealing compression may be controlled as the difference between the thickness 238 of the sealing lip 239 (in FIG. 4) of the plastic cap at 239 and the shoulder thickness 232. It will be understood that the plastic cap may have both a sealing lip 239 with a thickness 238 greater than the shoulder thickness 232 and also a cap contact surface thickness 237 that is thicker than the shoulder thickness 232 so that both the sealing lip 239 and the contact area of the plastic cap will be compressed controlled amounts.

In one embodiment, a portion of the compressive load that is controlled by the shoulder 230 is transmitted to the compressible sealing component 212, which causes the compressible sealing component 212 to partially compress in the axial direction to a compressed axial thickness 240. The portion of the compressive load transmitted to the compressible sealing component 212 causes compressible sealing component 212 to be partially compressed between the compression ledge 228 and the exterior body component 202. The compressible sealing component 212 is configured to form a seal when partially compressed between the exterior body component 202 and the compression ledge 228. The shoulder 230 is configured to abut the exterior body component 202 when the compressible sealing component 212, the sidewall panel 204, and the exterior body component 202 are compressed together between the external fastener component 211 and the internal fastener component 214. The compressed axial thickness 240 (shown in FIG. 5) of compressible sealing component 212 is substantially equal to the shoulder thickness 232. In one or more embodiments, the compressed axial thickness 240 may be smaller than the shoulder thickness 232, for example if the shoulder is not flat (for example conical or curved) or when the shoulder component itself compresses partially into the external body component 202, as by over tightening or minor deformation of the body due to controlled torque on the fastener In one or more embodiments a rotation preventer 234 may comprise at least one spline 235 or a plurality of splines $235_a$, $235_b$, $235_c$ ... $235_n$. By preventing rotation of the exterior fastener component, the sealing component 212 may be compressed axially without rotational skidding, scraping and potential galling, tearing or balling up between the compression ledge and the external body, in the area surrounding the hole into which the fastener is secured.

In one embodiment, the shoulder 230 is configured to abut an exterior contact surface of the external body component 202 that is adjacent to the at least one hole 208 when the external fastener component 211 compresses against the exterior contact surface.

In one or more embodiments, external fastener component 211 comprises rotation preventer 234 that is configured to restrict rotational movement of the compressible sealing component 212 relative to the exterior body component 202 when the compressible sealing component 212, the sidewall panel 204, and the exterior body component 202 are compressed together between the external fastener component 211 and the internal fastener component 214. The compressible sealing component 212 is configured to compress axially between the compression ledge 228 and the sidewall panel 204 when the external fastener component 211 is tightened. The compressible sealing component 212 is also configured to compress axially without rotation of the compressible sealing component 212 about an axis of the projection. The compressible sealing component 212 is configured to be axially compressed between the compression ledge 228 of the head 222 and the exterior body component 202 when the connection 200 is tightened. In one embodiment, the compressible sealing component 212 is configured to be axially compressed between the compression ledge 228 of the head 222 and the exterior body component 202 within a predetermined range of a minimum and a maximum percentage of the uncompressed axial thickness 237 of the compressible sealing component 212. The compressible sealing component 212 is axially compressed between the compression ledge 228 and the exterior contact surface of the exterior body component 202 adjacent to the at least one hole 208 to a compressed axial thickness 240 substantially equal to the shoulder thickness 232.

The at least one spline 235 is axially aligned along the projection 220 to allow axial compression of the compressible sealing component 212 between the compression ledge 228 and the exterior body component 202 when the connection is tightened. The at least one spline 235 comprises a peak sized to mechanically engage an interior edge of the at least one hole 208, 209 when the projection 220 extends therethrough. In one or more embodiment, the at least one spline 235 comprises a plurality of splines $235_a$, $235_b$, $235_c$ . . . $235_n$ that extend radially outward from the projection 220. The plurality of splines $235_a$, $235_b$, $235_c$ . . . $235_n$ extends axially upward from the shoulder 230 along at least a portion of an outer surface of the projection. The plurality of splines $235_a$, $235_b$, $235_c$ . . . $235_n$ extend axially further than both the uncompressed axial thickness 237 (in FIG. 4) and the shoulder thickness 232.

Figure 6:
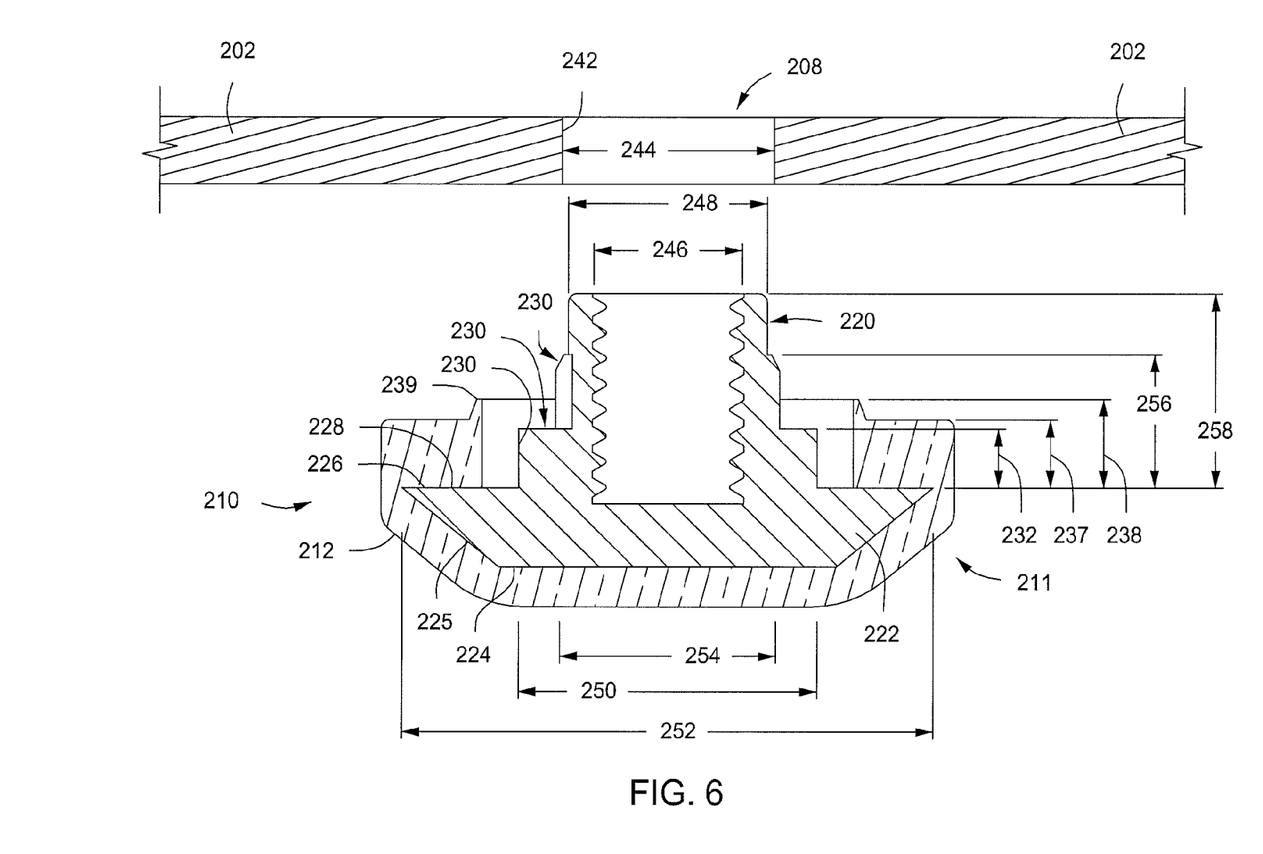
FIG. 6 is a schematic cross-sectional view of the external fastener component of FIGS. 4 and 5.

Referring now to FIG. 6, a cross-sectional view of the external fastener component 211 and exterior body component 202 is shown. The external fastener component 211 is shown partially inserted in hole 208 of the exterior body component 202.

The at least one spline 235 on projection 220 is configured to engage at least a portion of an inner surface 242 of the at least one hole 208, 209. The at least one spline 235 is configured to restrict rotational movement of the projection 220 when the at least one spline 235 is engaged with at least a portion of an inner surface 242 of the at least one hole 208, 209, and thereby prevent rotation of the external fastener component 211 and compressible sealing component 212. The at least one spline 235 is configured to restrict rotational movement of the projection 220 by engaging at least a portion of the inner surface 242 of the at least one hole 208, 209, which thereby prevents rotation of the external fastener component 211 and compressible sealing component 212.

The at least one hole 208 comprises an inner diameter 244. The projection 220 comprises an inner thread diameter 246 and an outer diameter 248, where the outer diameter 248 is measured from an outer surface thereof. The shoulder 230 comprises a diameter 250 measured from a radially outer surface thereof. The head 222 comprises a diameter 252, which is measured from opposing points on the edge 226. The rotation preventer 234 is disposed on the outer surface of the projection 220 and the rotation preventer 234 comprises an outer diameter 254.

In one embodiment, the outer diameter 248 of the projection 220 is smaller than the inner diameter 244 of hole 208. The outer diameter 254 of rotation preventer 234 is larger than the inner diameter 244 of hole 208, such that the rotation preventer 234 is configured to engage the inner surface 242 of hole 208. The shoulder diameter 250 is larger than the inner diameter 244 of hole 208, such that the shoulder 230 is configured to contact a portion of the exterior body component 202 that is adjacent to the hole 208 in order to control the compression, when the connection is tightened. In one embodiment, the outer diameter 254 of rotation preventer 234 is substantially equal to or smaller than the inner diameter 244 of hole 208.

The rotation preventer 234 comprises a rotation preventer height 256 that extends axially further than the uncompressed axial thickness 237 of the compressible sealing component 212. The rotation preventer height 256 is measured from the compression ledge 228 to an axial end of the rotation preventer 234. The projection 220 comprises a projection height 258 that extends axially further than the uncompressed axial thickness 237 of the compressible sealing component 212 and further than the rotation preventer height 256. The projection height 258 is measured from the compression ledge 228 to an axial end of the projection 220. As shown, in this exemplary embodiment, the shoulder thickness 232 is smaller than the uncompressed axial thickness 237 of the compressible sealing component 212.

In one or more embodiments, the external fastener component 211 is at least one of a nut, a sleeve, a bolt, and a rod. In one or more embodiments, the external fastener component 211 and the internal fastener component 214 may be interchanged.

With reference to FIGS. 4-6 together, the installation and use of the external fastener component 211 in the van body connection 200 is now discussed. The external fastener component 214 is formed comprising the head 222. The head 222 comprises the compression ledge 228 and the exterior end surface 224 with the edge 226 surrounding the exterior end surface 224. In one embodiment, the exterior end surface 224 is formed in the shape of a dome. In other embodiments, the exterior end surface 224 is formed into any suitable shape. In one embodiment, the edge 226 is formed into a circular shape.

The projection 220 is extended from the compression ledge 228 of the head 222. The projection 220 extends axially outward from the compression ledge 228 a distance shown by the projection height 258. The projection 220 is formed such that it intersects with the head 222.

The shoulder 230 is formed such that the shoulder extends from the compression ledge 228 where the head 222 and the projection 222 intersect. Forming the shoulder 230 comprises extending the shoulder 230 axially outward from the compression ledge 228 and along the projection 220, where the shoulder 230 extends along the projection 220 a distance shown by the shoulder thickness 232.

The exterior end surface 224 of head 222 is encapsulated with the compressible sealing component 212. An area of the compression ledge 228 that extends radially inward from the edge 226 is encapsulated with the compressible sealing component 212. The rotation preventer 234 is formed on the projection 220.

The projection 220 is inserted into at least one hole 208, 209 in the exterior body component 202 and the sidewall panel 204. Rotational movement of the external fastener component 211 is restricted by engaging the inner surface 242 of the at least one hole 208, 209 with the rotation preventer 234. Engaging the inner surface 242 of the at least one hole 208, 209 with the rotation preventer 234 restricts rotational movement of the external fastener component 211 but the rotation preventer 234 allows axial movement of the external fastener component 211, when the external fastener component 211 is being tightened.

The internal fastener component 214 is coupled to the projection 210, wherein the coupling comprises threaded engagement thereof. Coupling the internal fastener component 214 comprises the projection 220 receiving the shaft 218 of the internal fastener component 214 through the at least one hole 208, 209 in the exterior body component 202 and the sidewall panel 204. The external fastener component 211 and the internal fastener component 214 are tightened in order to compress and hold the exterior body component 202 and the sidewall panel 204 together. The tightening comprises axially compressing the compressible sealing component 212 between the exterior body component 202 and the compression ledge 228 of the head 222 without rotating the external fastener component 214 until the shoulder 230 abuts the exterior body component 202.

In one or more embodiments, the rotation preventer 214 comprises the plurality of splines $235_a$, $235_b$, $235_c$ . . . $235_n$ having peaks for engaging the inner surface 242 of the at least one hole 208, 209, the projection 220 comprising a non-circular cross-section configured to engage the inner surface 242 of the at least one hole 208, 209, and a roughening on the projection 220.

In one or more embodiments, a seal is formed between the compressible sealing component 212 and the exterior body component 202 by compressing the compressible sealing component 212 between the exterior body component 202 and the compression ledge 228 of the head 222, wherein the compressible sealing component 212 is compressed until the shoulder 230 contacts the exterior body component 212. Compressible sealing component 212 comprises the uncompressed axial thickness 237. The uncompressed axial thickness 237 extends further along an axis of the projection 220 than the shoulder thickness 232. The uncompressed axial thickness 237 extends less than the rotation preventer height 256 along an axis of the projection 220.

One of ordinary skill in the art will appreciate that the compressible sealing component 212 may be formed from any suitable material known in the art, for example, polymers, ceramics, and composites. One of ordinary skill in the art will appreciate that the projection 220, the head 222, and the shoulder 230 may be formed from any suitable material known in the art, for example, alloy steel, aluminum, other metals, composites, ceramics, and polymers. One of ordinary skill in the art will appreciate that the external fastener component 211 and the internal fastener component 214 may be formed from any material known in the art, for example, alloy steel, aluminum, other metals, composites, ceramics, and polymers. In the exemplary embodiment shown, the projection 220, the head 222, and the shoulder 230 are formed of alloy steel. In the exemplary embodiment shown, the external fastener component 211 and the internal fastener component 214 are formed of alloy steel.

Figure 7:
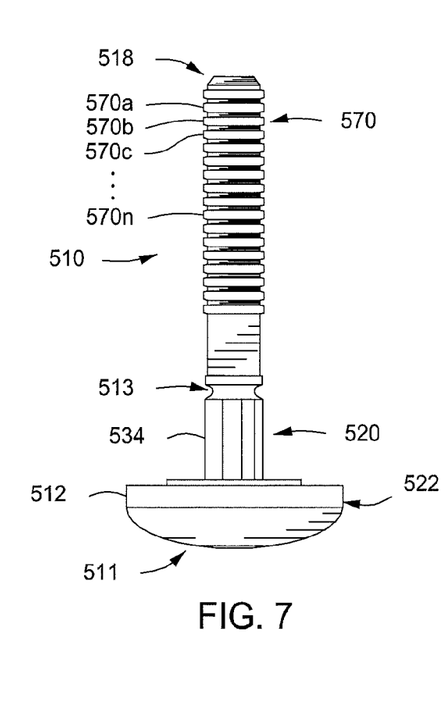
FIG. 7 is a view of an external fastener component in accordance with one or more embodiments disclosed herein.

Referring now to FIG. 7, a fastener 510 is shown. In this alternative embodiment, an external fastener component 511 may be used in a van body connection similar to that of FIGS. 4-6. The external fastener component 511 comprises a projection 520 and a head 522 disposed at one end of the projection 520. The head 522 comprises a compressible sealing component 512, wherein the compressible sealing component 512 encapsulates at least a portion of the head 522. Projection 520 comprises a rotation preventer 534 on at least a portion of an outer surface thereof. Formed on the projection 520 is a ratchet sleeve groove 513 configured to couple with a corresponding projection of an internal fastener component (not shown). In one embodiment, the rotation preventer 534 is formed on the projection 520 between the head 522 and the ratchet sleeve groove 513.

In one embodiment, the external fastener component 511 comprises a ratchet pin 518, where the ratchet pin 518 extends from the projection 520 and extends axially away from the head 522. The ratchet sleeve groove 513 is formed between the ratchet pin 518 and the rotation preventer 534 and the head 522. In one embodiment, the ratchet pin 518 comprises at least one ratchet surface 570. In other embodiments, the ratchet pin 518 comprises a plurality of ratchet surfaces $570_a$, $570_b$, $570_c$ . . . $570_n$.

As shown in this exemplary embodiment, the external fastener component 511 may be a ratchet bolt or a ratchet fastener, as would be known by those having ordinary skill in the art.

Figure 8:
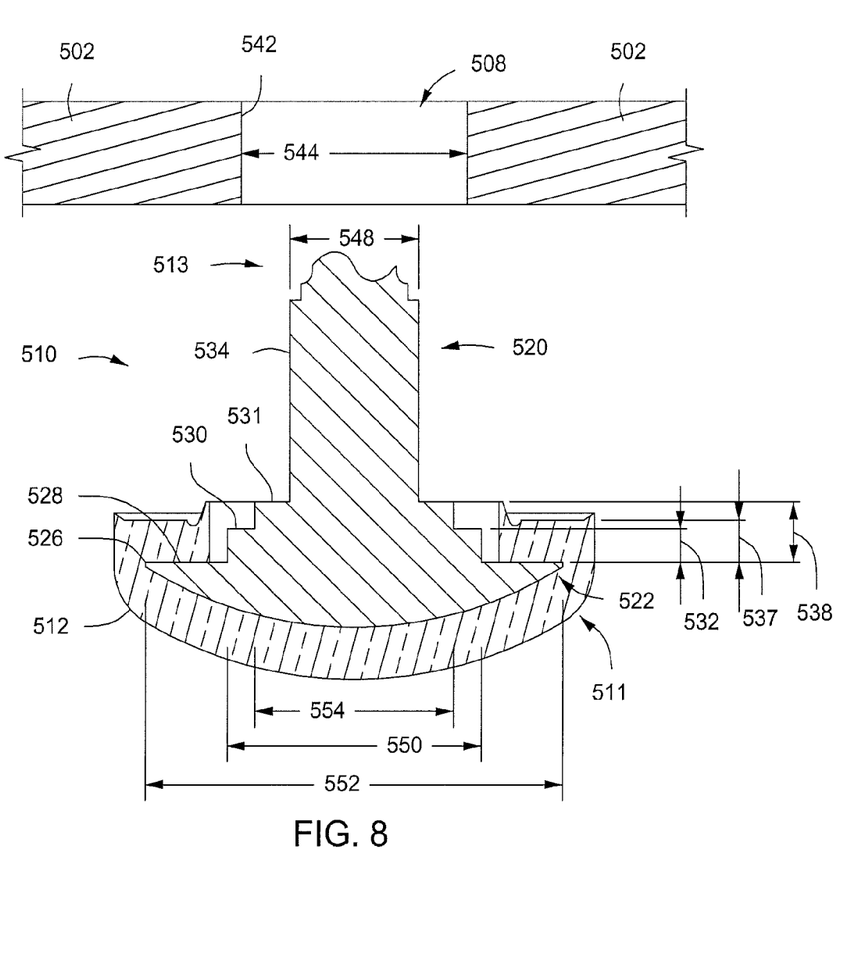
FIG. 8 is a partial cross-sectional view of the external fastener component of FIG. 7 showing additional detail of a head, shoulder, compression ledge and encapsulating plastic cap according to one or more alternative embodiments.

Referring now to FIG. 8, a cross-section view of the external fastener component 511 is shown. The external fastener component 511 is shown partially inserted in hole 508 of the exterior body component 502.

The at least one hole 508 comprises an inner diameter 544. The projection 520 comprises an outer diameter 548. The shoulder 530 comprises a diameter 550 measured from a radially outer surface thereof. The head 522 comprises a diameter 552, which is measured from diametrically opposing points on edge 526. The rotation preventer 534 is disposed on the outer surface of the projection 520. The second shoulder 531 comprises an outer diameter 554 measured from a radially outer surface thereof.

In one embodiment, the outer diameter 548 of the projection 520 is smaller than the inner diameter 544 of hole 508. The shoulder diameter 550 is larger than the inner diameter 544 of hole 508, such that the shoulder 530 is configured to contact an outer portion of the exterior body component 502 that is adjacent to the hole 508 in order to control the compression of the connection. In one embodiment, the outer diameter 554 of second shoulder 531 is substantially equal to or smaller than the inner diameter 544 of hole 508. The ratchet sleeve groove 513 is configured to receive and mate with the internal fastener component (not shown), where the ratchet sleeve groove 513 is formed on the projection axially spaced away from the shoulder 530 in order to control compression of the compressible sealing element 512 between the compression ledge 528 and the exterior body component 502.

In one or more embodiments, the rotation preventer 534 on projection 520 is configured to engage at least one of an inner surface 542 of the at least one hole 508, 509 and an inner surface of the internal fastener component 514 (not shown). In an alternative embodiment, at least one on an inner surface and an outer surface of the internal fastener component 514 (See FIGS. 9 and 10 below) comprises the rotation preventer 234 (FIGS. 4-6).

Figure 9:
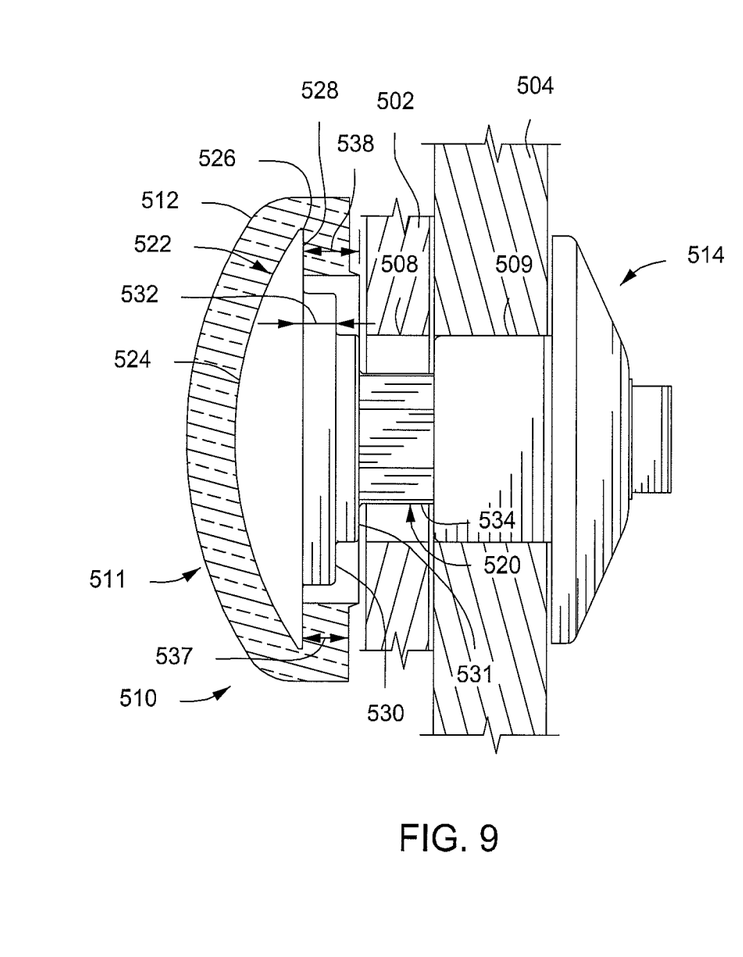

Referring now to FIG. 9, an assembly view of a van body connection 500 prior to being made up is shown. Van body connection 500 comprises an exterior body component 502 having at least one hole 508 that extends therethrough. Van body connection 500 includes a sidewall panel 504 having at least one hole 509 that extends therethrough. The at least one hole 509 corresponds to the at least one hole 508, where the at least one hole 509 and the at least one hole 508 are configured to line up when the exterior body component 502 and sidewall panel 504 are planarly aligned, e.g., parallel. Van body connection 500 may be referred to as connection 500 or simply the connection.

Van body connection 500 further comprises external fastener component 511. The external fastener component 511 comprises projection 520 configured to directly couple with an internal fastener component 514. In one embodiment, the projection 520 extends from the head 522 of the external fastener component 511 in an axial direction thereof. The projection 520 is configured to couple with the internal fastener component 514 through the at least one hole 508 and the corresponding at least one hole 509. The projection 520 of external fastener component 511 directly couples with the internal fastener component 514 by engaging the ratchet sleeve groove 513 (FIG. 7) with the internal fastener component 514. The axial direction or axially extending components will be used to describe the direction that lies along a central axis of the projection 520. In one embodiment, the internal fastener component 514 is a ratchet sleeve.

The external fastener component 511 comprising head 522 formed on a distal end of the projection 520. In one embodiment, the projection 520 extends from the head 522. The head 522 comprises an exterior end surface 524 and an edge 526 surrounding the exterior end surface 524. In one embodiment, the exterior end surface 524 is a domed surface having a circular cross-section when viewed from an axial end thereof. In other embodiments, the exterior end surface 524 has a non-circular cross-section when viewed from an axial end thereof.

Head 522 comprises a compression ledge 528 extending partially inward, in the radial direction, from the edge 526. In one embodiment, the compression ledge 528 is on an inner or interior surface of the head 522. Head 522 comprises a shoulder 530 extending axially from the compression ledge 528 along the projection 520. Shoulder 530 comprises a shoulder thickness 532, where the shoulder thickness 532 is measured from the compression ledge 528 and extends axially away from the head 522. The shoulder 530 extends in a radially outward direction from the projection 520. In one embodiment, the shoulder 530 is formed at an intersection of the projection 520 and the compression ledge 528. Shoulder 530 comprises a second shoulder 531 that extends axially upward from the shoulder 530 in the direction of the projection 520. The second shoulder 531 is diametrically smaller than the shoulder 530.

The external fastener component 511 comprises the rotation preventer 534 formed on the projection 520 and configured to restrict rotational movement of the external fastener component 511 within the at least one hole 508, 509. In one embodiment, the rotation preventer 534 comprises the rotation preventer 234 (FIGS. 4-6). In other embodiments, the rotation preventer 534 comprises at least one of a surface roughening and a knurling. Rotation preventer 534 is configured to allow axial movement of the external fastener component 511. In one embodiment, rotation preventer 534 is configured to project from the projection 520 and mechanically engage an interior surface of the at least one hole 508, 509. In one embodiment, rotation preventer 534 is configured to project from the projection 520 and mechanically engage an inner surface of the internal fastener component 514 (not shown).

The external fastener component 511 comprises the compressible sealing component 512 that encapsulates the head 522 and at least a portion of the compression ledge 528. As shown, the compressible sealing component 512 comprises an uncompressed axial thickness 537. The uncompressed axial thickness 537 and the shoulder thickness 532 both being measured in the axial direction of the projection 520 and measured from the compression ledge 528. The uncompressed axial thickness 537 extends further than the shoulder thickness 532, where both thicknesses are measured from the compression ledge 528.

In one or more embodiments, the fastener 511 is a ratchet pin-type fastener comprising non-helical grooves and peaks, where the external fastener component 511 and the internal fastener component 514 are configured to be tightened by an axial ratchet mechanism (not shown) in order to compress the exterior body component 502 and the sidewall panel 504. In one or more embodiments, the rotation preventer 534 comprises a non-circular cross-section.

Figure 10:
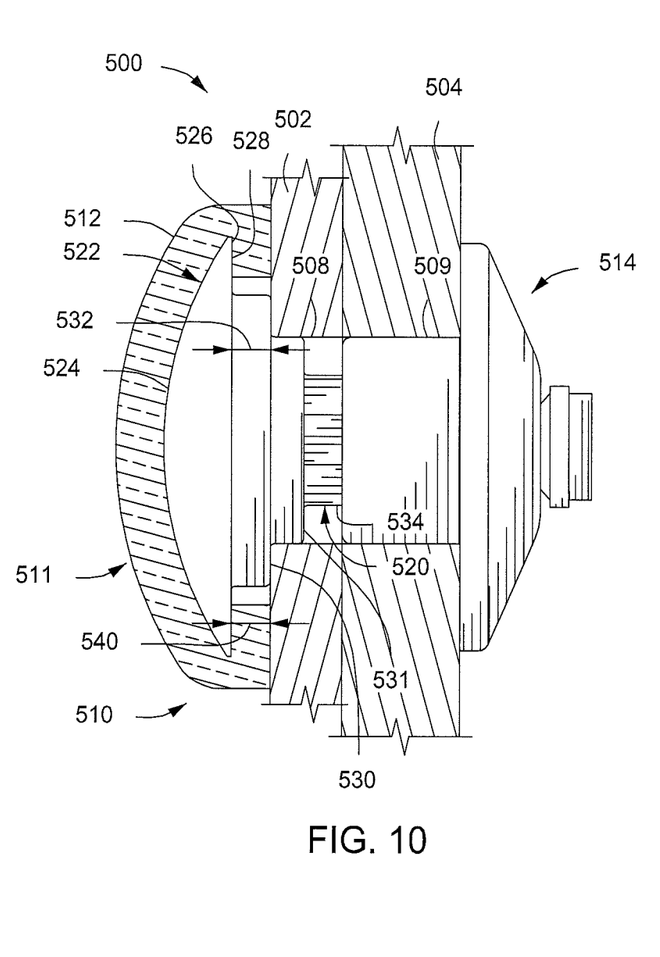
FIG. 10 is a cross-sectional view of the fastener and connection of FIG. 9 in a compressed configuration.

Referring now to FIG. 10, an assembly view of the van body connection 500 after makeup is shown. Similar reference numbers and features described in FIGS. 7 and 8 correspond to reference numbers and features in FIG. 9. As shown in this exemplary embodiment, the exterior body component 502 and sidewall panel 504 are compressed together by making up the van body connection 500.

Internal fastener component 514 is configured to couple with the projection 520 through the at least one hole 508, 509 and to hold the shoulder 530 in contact with the exterior body component 502 and to compress the sidewall panel 504 and the exterior body component 504 together therebetween when the connection 500 is made up. In one embodiment, the internal fastener component 514 couples with the ratchet sleeve groove 513 and holds the shoulder 530 of external fastener component 511 in contact with a portion of the exterior body component 502 surrounding the at least one hole 508. The shoulder 530 contacts the portion of the exterior body component 502 surrounding the at least one hole 508, when the connection 500 is made up, which transmits a compressive load from the shoulder 530 through exterior body component 502 and sidewall panel 504 to the internal fastener component 514. The compressive load is controlled by the shoulder 530 contacting or abutting the exterior body component 502 and thereby creating a metal-to-metal contact surface between the shoulder 530 and the external body component 502. In one embodiment, the second shoulder 531 does not contact the portion of the exterior body component 502 surrounding the at least one hole 508, when the connection 500 is made up. In one embodiment, the second shoulder 531 does contact the exterior body component 502 when the connection 500 is made up.

In one embodiment, a portion of the compressive load that is controlled by the shoulder 530 is transmitted to the compressible sealing component 512, which causes the compressible sealing component 512 to partially compress in the axial direction to a compressed axial thickness 540. The portion of the compressive load transmitted to the compressible sealing component 512 causes compressible sealing component 512 to be partially compressed between the compression ledge 528 and the exterior body component 502. The compressible sealing component 512 is configured to form a seal when partially compressed between the exterior body component 502 and the compression ledge 528. The shoulder 530 is configured to abut the exterior body component 502 when the compressible sealing component 512, the sidewall panel 504, and the exterior body component 502 are compressed together between the external fastener component 511 and the internal fastener component 514. The compressed axial thickness 540 of compressible sealing component 512 is substantially equal to the shoulder thickness 532. In one or more embodiments, the compressed axial thickness 540 is smaller than the shoulder thickness 532. The compressed axial thickness 540 is smaller than the uncompressed axial thickness 537 (FIG. 9).

In one embodiment, the shoulder 530 is configured to abut an exterior contact surface of the external body component 502 that is adjacent to the at least one hole 508 when the external fastener component 511 compresses against the exterior contact surface.

In one or more embodiments, external fastener component 511 comprises rotation preventer 534 that is configured to restrict rotational movement of the compressible sealing component 512 relative to the exterior body component 502 when the compressible sealing component 512, the sidewall panel 504, and the exterior body component 502 are compressed together between the external fastener component 511 and the internal fastener component 514. The compressible sealing component 512 is configured to compress axially between the compression ledge 528 and the exterior body component 502 when the external fastener component 511 and internal fastener component 514 are tightened. The compressible sealing component 512 is also configured to compress axially without rotation of the compressible sealing component 512 about an axis of the projection. The compressible sealing component 512 is configured to be axially compressed between the compression ledge 528 of the head 522 and the exterior body component 502 when the connection 500 is tightened. In one embodiment, the compressible sealing component 512 is configured to be axially compressed between the compression ledge 528 of the head 522 and the exterior body component 502 within a predetermined range of a minimum and a maximum percentage of the uncompressed axial thickness 537 of the compressible sealing component 512. The compressible sealing component 512 is axially compressed between the compression ledge 528 and the exterior contact surface of the exterior body component 502 adjacent to the at least one hole 508 to a compressed thickness 540 substantially equal to the shoulder thickness 532.

In one embodiment, the connection 500 is not made up by a torque applied to either external fastener component 511 or internal fastener component 514, but by gripping the ratchet pin 518 with a ratchet tool (not shown) and applying an axial load to the internal fastener component 514 in order to push the internal fastener component 514 towards the head 522 until the internal fastener 514 component engages with the ratchet sleeve groove 513 (FIG. 7).

Advantageously, apparatus and method embodiments disclosed herein may provide a stronger and longer lasting fastener assembly for use in the van body industry. The fastener assembly may also provide a stronger connection and more stable van body structure. The fastener assembly may reduce cost from over designing other components that were previously susceptible to falling out, as well as reduce cost due to decrease in replacement parts. Embodiments disclosed herein provide a fastener assembly that restricts rotational movement of the external fastener component but allows axial movement thereof, and provides a seal around a hole in the van body. Embodiments disclosed herein advantageously provide a shoulder formed on the external fastener component to control the compression in a sealing component on the external fastener, in order to increase the strength and life of the connection, as well as the external fastener component and the sealing component disposed thereon. Thus, the shoulder controls the compression load in the connection and provides a metal to metal contact surface for the connection, which distributes the compression load through the metal components instead of through the plastic sealing component.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:
1. A system comprising:
    a body component having at least one hole;
    a sidewall panel having at least one hole that corresponds with the hole of the body component when aligned;
    an external fastener component comprising:
        a projection configured to extend into the at least one hole in the body component and the corresponding at least one hole in the sidewall panel;
        a head formed on a distal end of the projection, wherein the head comprises:
            an exterior end surface;
            an edge surrounding the exterior end surface;
            a compression ledge extending partially inward from the edge toward the projection and having a face area entirely surrounding the projection; and
            a contact shoulder extending partially outward from the projection toward the edge and raised axially from the compression ledge a predetermined shoulder thickness measured axially from the compression ledge;
        a rotation preventer formed on the projection and configured to restrict rotational movement of the external fastener component within the at least one hole; and
        a compressible sealing component that extends over the exterior end surface of the head and extends radially inward towards the projection and at least partially overlapping the face area entirely around the compression ledge, wherein the compressible sealing component at the partially overlapping face area has an uncompressed axial thickness greater than the shoulder thickness; and
    an internal fastener component configured to couple with the projection through the at least one hole and to hold the contact shoulder of the external fastener component in contact with the exterior body component and to compress the sidewall panel and the exterior body component together therebetween,
    wherein the compressible sealing component is configured to form a seal when partially compressed between the exterior body component and the compression ledge and the contact shoulder is configured to abut the exterior body component when the compressible sealing component, the sidewall panel, and the exterior body component are compressed together between the external fastener component and the internal fastener component.

2. The system of claim 1, wherein the projection has a circular cross-section normal to its axis and the rotation preventer comprises at least one spline that extends radially outward from the projection, is axially aligned along the projection to allow axial penetration of the projection into the hole, and is configured to engage the at least one hole when the projection is disposed within the hole, thereby preventing rotation of the external fastener component and the compressible sealing component and to allow axial compression of the compressible sealing component between the compression ledge and the exterior body component.

3. The system of claim 2, wherein the at least one spline comprises a plurality of splines that extend radially outward from the projection and axially extending from the shoulder along at least a portion of an outer surface of the projection.

4. The system of claim 3, wherein the plurality of splines extend axially further than the uncompressed axial thickness of the compressible sealing component.

5. The system of claim 1, wherein the external fastener component comprises the rotation preventer configured to restrict rotational movement of the compressible sealing component relative to the exterior body component when the compressible sealing component, the sidewall panel, and the exterior body component are compressed together between the external fastener component and the internal fastener.

6. The system of claim 1, wherein the compressible sealing component is configured to compress axially between the compression ledge and the sidewall panel when the external fastener component is tightened, wherein the compressible sealing component is further configured to compress axially without rotation of the compressible sealing component about an axis of the projection.

7. The system of claim 1, wherein the rotation preventer comprises a non-circular cross-section of the projection and the at least one hole is configured and sized to engage the non-circular cross-section of the projection when the projection is inserted into the at least one hole to thereby prevent rotation.

8. The system of claim 1, wherein the compressible sealing component is configured to be axially compressed between the head and the exterior body component within a predetermined range of a minimum and a maximum percentage of the uncompressed axial thickness of the compressible sealing component.

9. The system of claim 1, wherein the compressible sealing component comprises a polymer.

10. The system of claim 1, wherein the projection, the head, and the shoulder comprise metal.

11. The system of claim 1, wherein the projection, the head, and the shoulder comprise steel.

12. The system of claim 1, wherein the external fastener component is at least one of a nut, a sleeve, a bolt, and a rod.

13. A fastener comprising:
a head comprising an exterior end surface and a compression ledge;
a projection that extends from the compression ledge;
a shoulder formed at an intersection of the projection and the compression ledge, the shoulder comprises a shoulder thickness measured from the compression ledge and extends axially along the projection;
a compressible sealing component configured to encapsulate the exterior end surface and at least partially overlaps an area entirely around the compression ledge, wherein the compressible sealing component comprises an uncompressed axial thickness at a face area of the compression ledge extending partially outward from the shoulder and having the face area entirely surrounding the projection, wherein the uncompressed axial thickness is greater than the shoulder thickness; and
a rotation preventer formed on the projection and configured to restrict rotation of the fastener when the projection extends into a hole through an exterior body component or a sidewall panel in order to be received therethrough,
wherein the rotation preventer allows axial movement of the fastener without rotation of the plastic cap relative to the body component or sidewall panel upon tightening of the fastener.

14. The fastener of claim 12, wherein the rotation preventer is configured to extend from the projection and mechanically engage an interior surface of the hole.

15. The fastener of claim 12, wherein the rotation preventer comprises at least one spline that extends radially outward from the projection and the at least one spline comprises a peak sized to mechanically engage an interior edge of the hole when the projection extends therethrough.

16. The fastener of claim 12, wherein the shoulder is configured to abut an exterior contact surface adjacent to the hole of the exterior body component when the fastener compresses against the exterior contact surface.

17. The fastener of claim 15, wherein the compressible sealing component is axially compressed between the compression ledge and the exterior contact surface of the exterior body component adjacent to the hole to a compressed thickness substantially equal to the shoulder thickness.

18. A method comprising:
forming an external fastener component comprising:
forming a head comprising a compression ledge and an exterior end surface with an edge surrounding the exterior end surface;
extending a projection from the compression ledge of the head;
forming a shoulder extending from the compression ledge where the head and the projection intersect;
encapsulating the exterior end surface of the head and an area of the compression ledge that extends radially inward from the edge with a compressible sealing component; and
forming a rotation preventer on the projection;
inserting the projection into at least one hole in an exterior body component and a sidewall panel;
restricting rotational movement of the external fastener component by engaging an inner surface of the at least one hole with the rotation preventer, wherein the engaging the inner surface of the at least one hole with the rotation preventer restricts rotational movement but allows axial movement of the external fastener;
coupling an internal fastener component to the projection, wherein coupling comprises the projection receiving the internal fastener component through the at least one hole in the exterior body component and the sidewall panel;
tightening the external fastener component and the internal fastener component in order to compress and hold the exterior body component and the sidewall panel together,
wherein the tightening comprises axially compressing the compressible sealing component between the exterior body component and the compression ledge of the head without rotating the external fastener component until the shoulder abuts the exterior body component.

19. The method of claim 17, wherein the rotation preventer comprises at least one of a plurality of splines having peaks for engaging the inner surface of the at least one hole, the projection comprising a non-circular cross-section configured to engage the inner surface of the at least one hole, and a roughening on the projection.

20. The method of claim 17 further comprises forming a seal between the compressible sealing component and the exterior body component by compressing the compressible sealing component between the exterior body component and the compression ledge of the head, wherein the compressible sealing component is compressed until the shoulder contacts a surface area around the at least one hole.

21. The method of claim 17, wherein the compressible sealing component comprises an uncompressed axial thickness that extends further along an axis of the projection than a shoulder thickness and extends less than a rotation preventer height.

* * * * *